(12) United States Patent
Bilobrov et al.

(10) Patent No.: US 7,386,125 B2
(45) Date of Patent: Jun. 10, 2008

(54) TECHNIQUES OF IMPERCEPTIBLY ALTERING THE SPECTRUM OF A DISPLAYED IMAGE IN A MANNER THAT DISCOURAGES COPYING

(75) Inventors: Sergiy Bilobrov, Coquitlam (CA); Jason A. Lesperance, Vancouver (CA)

(73) Assignee: QDesign USA, Inc., Seattle, WA (US)

( * ) Notice: Subject to any disclaimer, the term of this patent is extended or adjusted under 35 U.S.C. 154(b) by 684 days.

(21) Appl. No.: 10/282,404

(22) Filed: Oct. 28, 2002

(65) Prior Publication Data

US 2004/0081318 A1 Apr. 29, 2004

(51) Int. Cl.
H04N 7/167 (2006.01)
H04N 5/91 (2006.01)
G02B 21/10 (2006.01)

(52) U.S. Cl. .............. 380/201; 380/201; 359/379; 386/94

(58) Field of Classification Search ............. 380/201; 359/379; 386/94
See application file for complete search history.

(56) References Cited

U.S. PATENT DOCUMENTS

| | | | |
|---|---|---|---|
| 4,914,694 A | 4/1990 | Leonard et al. | |
| 5,680,454 A * | 10/1997 | Mead | 380/204 |
| 5,959,717 A | 9/1999 | Chaum | |
| 6,018,374 A * | 1/2000 | Wrobleski | 348/744 |
| 6,529,600 B1 | 3/2003 | Epstein et al. | |
| 6,559,883 B1 | 5/2003 | Fancher et al. | |
| 7,043,019 B2 * | 5/2006 | Tehranchi et al. | 380/218 |
| 2001/0045992 A1 | 11/2001 | Ogino et al. | |
| 2002/0009000 A1 | 1/2002 | Goldberg et al. | |
| 2002/0168069 A1 * | 11/2002 | Tehranchi et al. | 380/235 |
| 2003/0227442 A1 | 12/2003 | Nishi et al. | |
| 2004/0064702 A1 | 4/2004 | Yu et al. | |
| 2004/0242405 A1 * | 12/2004 | Orme | 502/101 |

FOREIGN PATENT DOCUMENTS

| | | |
|---|---|---|
| CA | 2032587 | 7/1996 |
| DE | 2347836 | 4/1975 |
| EP | 1372342 | 12/2003 |
| GB | 1 407 065 | 9/1975 |

(Continued)

OTHER PUBLICATIONS

Guowei Hong, M. Ronnier Luo, peter A. Rhodes, Astudy of dgital camera colormetric characterization based on polynomial modeling, Aug. 24, 1999, Univ. of Derby.*

(Continued)

*Primary Examiner*—Nasser Moazzami
*Assistant Examiner*—Mohammad Reza
(74) *Attorney, Agent, or Firm*—Davis Wright Tremaine LLP

(57) ABSTRACT

Copying of visual images by electronic devices is discouraged by metamerically altering the relative weights of the color components forming the visual images in a manner that is not perceptible to the human eye but which is perceptible in the copy. In a preferred technique, the visual images are represented by more than three primary color components whose relative values are varied in this manner. A primary application is to discourage copying by video cameras of movies displayed on theater movie screens, by causing the copies to contain unacceptable spatial or temporal variations in colors perceived by the human eye.

4 Claims, 3 Drawing Sheets

FOREIGN PATENT DOCUMENTS

| | | |
|---|---|---|
| JP | 71025288 | 7/1971 |
| JP | 2001159094 | 6/2001 |
| JP | 2001279140 A | 10/2001 |
| WO | WO 01/01704 A1 | 1/2001 |
| WO | WO 01/33846 | 5/2001 |
| WO | WO 01/56279 A2 * | 8/2001 |
| WO | WO 2004/04088 A2 | 5/2004 |

OTHER PUBLICATIONS

IPEA/US, "Written Opinion", mailed in corresponding PCT/US03/34116, dated Aug. 24, 2004, 4 pages.

"Notification of Transmittal of the International Search Report or the Declaration," from corresponding International Application No. PCT/US03/34116, PCT International Searching Authority (PCT), Jun. 30, 2004, 4 pages.

European Patent Office, "Supplemental Search Report," mailed in corresponding European application No. EP 03 78 1410 on Jun. 7, 2006, 2 pages.

ISA/PCT, "Notification of Transmittal of International Preliminary Examination Report," mailed in corresponding International application No. PCT/US03/34116 on Apr. 19, 2005, 4 pages.

Günther Wyszecki et al., "Color Science, Concepts and Methods, Quantitative Data and Formulae," Second Edition, 2000, pp. ix-xv, 183-212, 554-566.

* cited by examiner

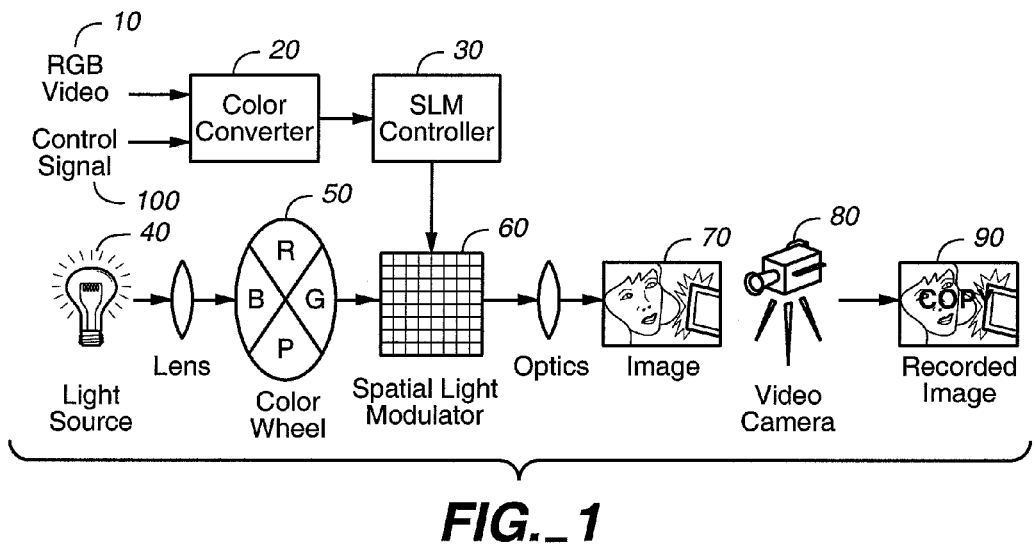
FIG._1
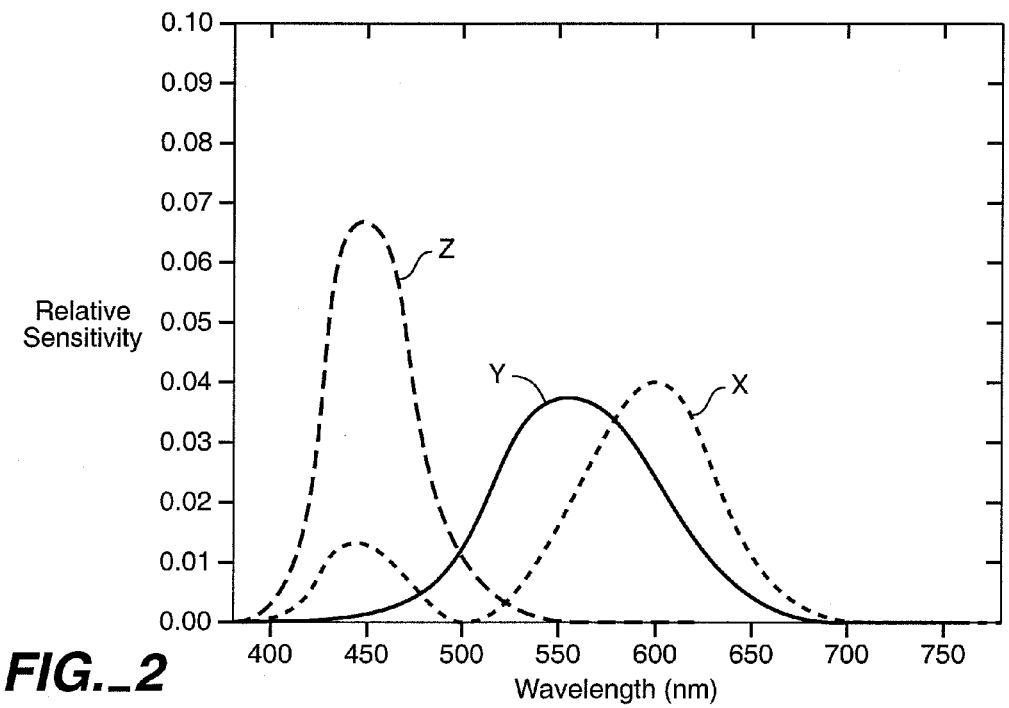
FIG._2

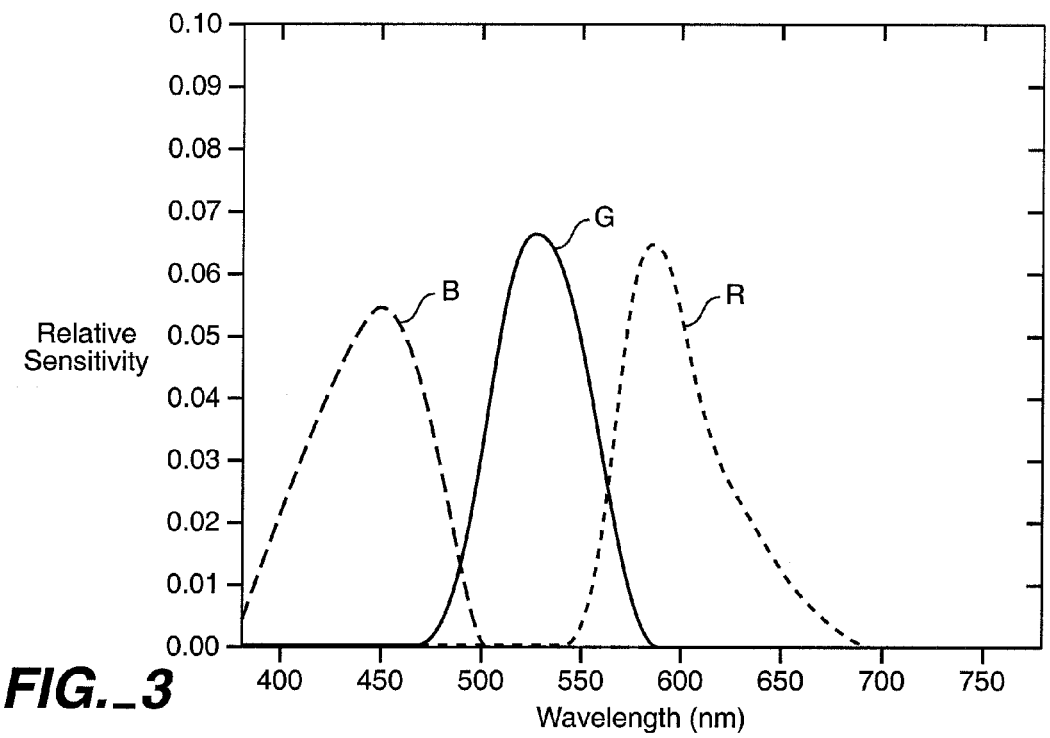
FIG._3
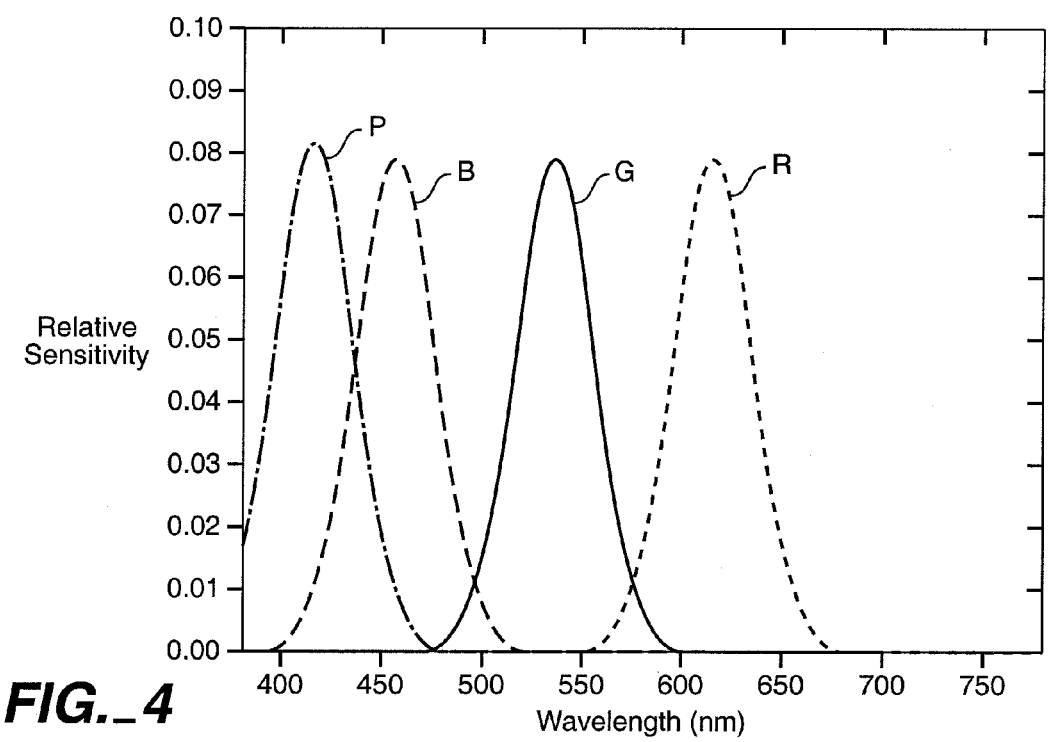
FIG._4

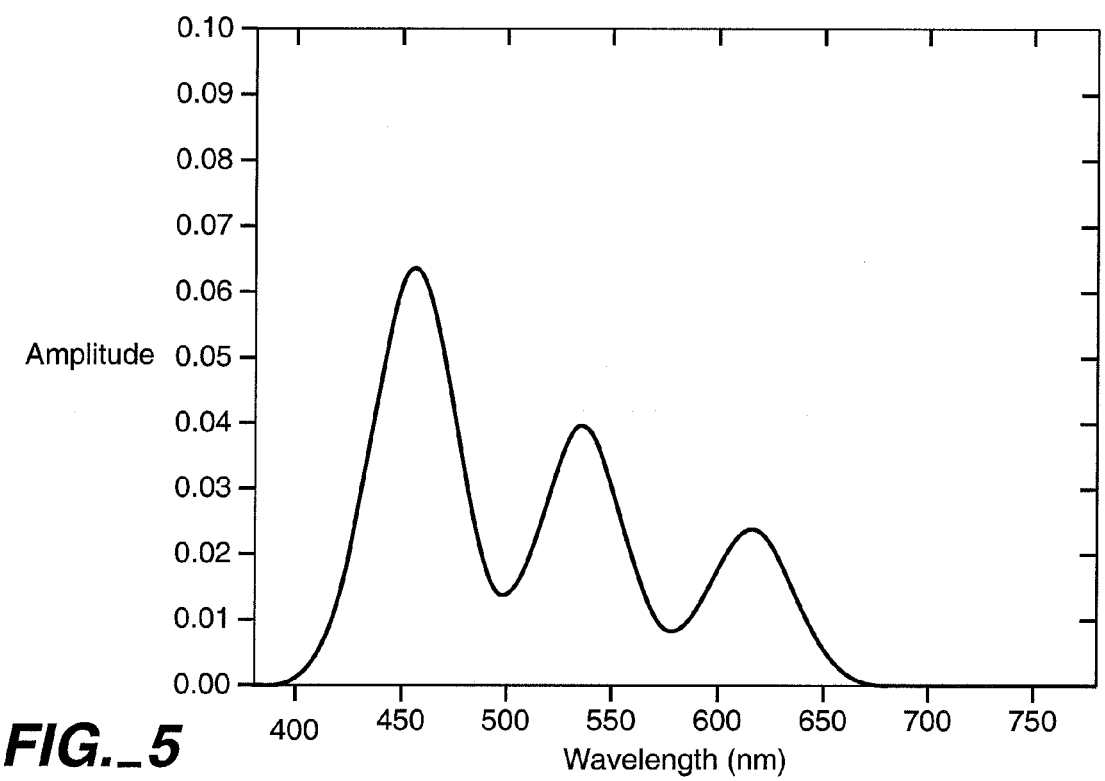
FIG._5
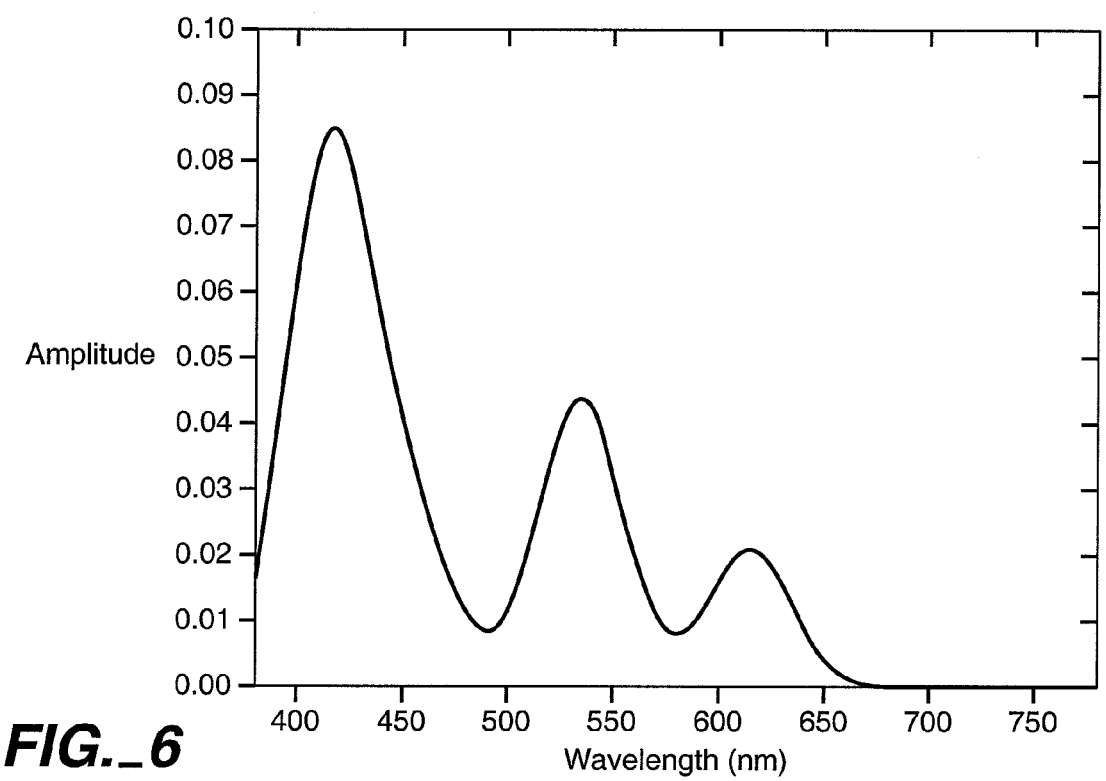
FIG._6

TECHNIQUES OF IMPERCEPTIBLY ALTERING THE SPECTRUM OF A DISPLAYED IMAGE IN A MANNER THAT DISCOURAGES COPYING

FIELD OF THE INVENTION

This invention concerns the protection of visual images, principally films and videos, from illicit recording and distribution. Specifically, this invention relates to providing a visual deterrent to the recording of images from a film or video screen by a video recording device, and the subsequent illicit redistribution of the recording.

BACKGROUND OF THE INVENTION

Owners of digital programming and content are increasingly reluctant to transmit their products unless digital media devices incorporate technologies to prevent them from being copied and widely disseminated without payment to the copyrights holders. Because digital content can be copied quickly, easily, and without degradation, digital programming and content owners face an exponentially increasing piracy threat. Digital Rights Management (DRM) systems have been developed which can control access to content which is in a digital file format, but these systems do not address the possibility of direct recording of the played-back content from a screen or output device. When the content is viewed by a consumer, it is converted to analog format, and DRM systems can no longer prevent unauthorized access to the content.

The revenue model of the film industry depends on a system of staged release, with films typically generating most of their revenue within the first few weeks of initial cinematic release. Subsequent releases in other regions and in other formats (DVD, broadcast pay-per-view, and others) are delayed to maximize revenue from the cinematic release. Thus, a costly point at which film or video content is pirated is during the initial theatrical release. Hand-held or tripod-mounted video cameras are used by individuals to record motion picture films directly from theater screens. The recordings of these films are then copied onto blank videocassettes and encoded onto CDs and DVDs for illegal distribution. These illicit copies are widely distributed over the Internet and through physical channels even before the film's international cinematic release.

One method of cinematic release protection employs a visual watermark, or 'fingerprint' in the film to identify the source of the illicit copy. These transparent video watermarks may be inserted into the film image at the point of production or at the projection point, but the resulting content can still be recorded by a video camera without noticeable impairment. A watermark detector is employed to forensically analyze suspected pirated content for a watermark identifying the print and theater where the recording took place. Such a video watermark may survive the recording process and allow identification of the projector/theatre in which the recording took place, but it does not prevent the recording of the film or compression of the resulting video.

Many entertainment companies use encryption and copy protection technologies to protect their content against unauthorized distribution. Some delivery systems for film content already use some form of copy protection, including DVDs (which use a Content Scrambling System), video tapes and digital cinema systems, which employ digital encryption to protect the film from copying until it is projected on the screen. Although encryption and scrambling techniques can be effective in protecting against unauthorized copying of the digital stream or file, none of these systems can protect against the copying of the visual content as it is being viewed without encryption or scrambling.

SUMMARY OF THE INVENTION

The present invention addresses the problem of protecting content from unauthorized duplication such as recording the output of a video display or cinema screen. The recording device is typically a camcorder which has spectral sensitivity that is different than the human eye. That is, while the human eye has three types of color photoreceptor cone cells that respond to incident light with one particular set of spectral component response curves, video recording devices typically use a two-dimensional array of light sensing elements that respond to a somewhat different set of three primary spectral component response curves, usually RGB (red, green and blue). This characteristic is utilized in the present invention by altering the spectrum of the displayed image in a way that does not change the perception of the image colors by the human eye but which does change those colors in the image captured by the video recording device. These color changes result in degrading the images reproduced from the video recording device. This reduces the value of the copied video and thus discourages such illicit copying.

In a particular application, the visual image is displayed in more than three primary color spectra, such as four, that are altered across the image or in time in a manner that is metameric to the human eye; that is, the alterations are not perceivable to the human eye. The value of the movie, video or other display is thus not lessened since the changes to the images are not noticeable to the audience. But when the display is copied with a camcorder or other video recording device having different color response characteristics than the human eye, images reproduced from the resulting recording are severely degraded with annoying color variations.

There are many ways to implement the techniques of the present invention. For example, the processing can be applied to a visual image signal at recording time, or as part of the encoding process of protected digital media that are then distributed to theatres and the like for authorized viewing. In another example, the techniques can be applied to the output of a film or video projector with little modification to the projector.

The techniques of the present invention are most advantageously applied to self-luminous displays; that is, displays that generate the light that forms the image. Examples of such displays are projectors, such as those that project images onto a screen, and video monitors that generate light, such as cathode-ray-tubes and backlighted liquid crystal devices. These can be contrasted with displays that require the use of external illumination to enable viewing of the image, such as print media. In this type of display, the spectral characteristics of a viewed image are dependent upon the spectrum of the light that illuminates it as well as the spectral reflectance of the image itself.

Additional aspects, advantages and features of the present invention are included in the following description of exemplary examples thereof, which description should be taken in conjunction with the accompanying drawings.

BRIEF DESCRIPTION OF THE DRAWINGS

FIG. 1 schematically illustrates one embodiment of the present invention;

FIG. 2 shows the color response of color cone cells of the human eye;

FIG. 3 illustrates a typical color response of a video camera;

FIG. 4 shows an example spectrum produced by a four color display device that is used in the present invention; and FIGS. 5 and 6 are example spectral power distribution curves of an image that are metameric to the human eye.

DETAILED DESCRIPTION OF EXEMPLARY EMBODIMENTS

The techniques of the present invention utilize principles of color perception. Color perception is a result of radiation in the visible spectrum exciting three types of photosensitive cone cells in the retina. Each type of cone cell responds to incident light with a different spectral response. As a result, color perception is inherently trichromatic. In 1931, the Commission Internationale de L'Eclairage (CIE) defined a set of three standard color matching functions that were calculated based on a series of color matching experiments with human observers. The color matching functions are a linear combination of the average spectral response of the three types of cone cells. These color matching functions x (red), y (green) and z (blue), shown in FIG. 2, specify how a spectral power distribution can be transformed to a set of tristimulus values XYZ that specify the complete color space for a hypothetical standard human observer. To calculate the XYZ values, the product of the spectral power distribution of an image and the color matching functions is integrated. As made clear by this calculation, there are many different spectral power distributions that result in the same XYZ values and thus the same perceived color. Different spectral power distributions that result in the same perceived color are referred to as metamers. The principle of metamerism forms the basis for all modern color image reproduction.

Similar to the human eye, a typical color video camera filters incident light into three spectral bands and records each band with a two dimensional array of photosensitive elements. The spectral sensitivity curves for a typical video camera are shown in FIG. 3. Due to numerous design constraints, the sensors in video cameras are not colorimetric in the sense that their spectral sensitivity is not a simple linear transformation of the CIE color matching functions. As a result, spectral power distributions that are metamers for the human eye may not be metamers for the video camera sensor and vice versa, and usually are not. The present invention exploits this difference to produce visible color distortions when using a video camera to capture a video or film presentation.

While the difference in human and video camera color perception is significant, the resulting color distortion caused when recording with a video camera is generally accepted and not very annoying. This is largely because the shift in the recorded color from the observed color is constant in time and space. To provide a significant deterrent to copying a video or film presentation a method for varying the shift in color is required.

Nearly all current commercial display systems make use of three primary color components combined either additively or subtractively to form the visual image. Since the human visual system is also trichromatic, a given perceived color is achieved with one unique combination of the three primaries resulting in only one possible spectral power distribution for a given three primary display system. To vary the spectral power distribution without varying the perceived color, at least one additional primary component is required. An example of four color components RGBP is given in FIG. 4. The additional primary component allows for the creation of multiple spectral power distributions that are perceived as the same color by the human eye but result in different values in the video camera. By varying the spectral power distribution over the set of metamers temporally and spatially, significant visible distortions can be created in the video camera recorded copy.

FIG. 1 shows a general application of an exemplary embodiment of the present invention, wherein a video signal to be displayed is processed at the point of display. An original video signal 10 consisting of RGB values intended for display on a system with three primary components is processed by a color converter 20. This device outputs a new video signal consisting of RGBP values representing the relative light levels of four primary components. The selection of the RGBP output value for a given input RBG value is controlled by a control signal 100. This processed signal is then projected on the screen by sequentially displaying the four primary components using a single light source 40, a rotating color wheel 50 with four primary color filters (RGBP), and a single spatial light modulator device 60. An image 70 on the screen appears visibly unimpaired to an observer but when the image is recorded with a typical video camera 80, a resulting image 90 is visibly impaired.

The processing of the RGB signal to produce the RGBP signal is designed such that the RGBP values for a given pixel produce a spectral power distribution that is metameric with the original intended RGB value. One means to accomplish this is described below.

Given an RGB value intended for display on a system such as that specified in CCIR Recommendation 709 for HDTV, the intended color in the XYZ coordinate system can be calculated as follows:

$$\begin{bmatrix} X \\ Y \\ Z \end{bmatrix} = \begin{bmatrix} 0.413 & 0.358 & 0.180 \\ 0.2213 & 0.715 & 0.072 \\ 0.019 & 0.119 & 0.950 \end{bmatrix} \cdot \begin{bmatrix} R \\ G \\ B \end{bmatrix}$$

Making use of the color matching functions for a standard observer shown in FIG. 2 and the spectral power distribution of a hypothetical 4 primary display system shown in FIG. 4, a similar equation can be calculated for converting between RGBP and XYZ values:

$$\begin{bmatrix} X \\ Y \\ Z \end{bmatrix} = xyz_{3 \times 101} \cdot rgbp_{4 \times 101}^T \cdot \begin{bmatrix} R \\ G \\ B \\ P \end{bmatrix}$$

where xyz is the matrix of color matching functions and rgbp is the matrix of primaries both specified at 4 nm intervals between 380 and 780 nm. This equation simplifies to:

$$\begin{bmatrix} X \\ Y \\ Z \end{bmatrix} = A_{3\times 4} \cdot \begin{bmatrix} R \\ G \\ B \\ P \end{bmatrix}$$

Making use of singular value decomposition the equation can be specified as follows:

$$\begin{bmatrix} X \\ Y \\ Z \end{bmatrix} = U_{3\times 3} \cdot S_{3\times 4} \cdot V_{4\times 4}^T \cdot \begin{bmatrix} R \\ G \\ B \\ P \end{bmatrix}$$

where U and V are orthogonal and S is the matrix of singular values and has the form:

$$S_{3\times 4} = \begin{bmatrix} s_1 & 0 & 0 & 0 \\ 0 & s_2 & 0 & 0 \\ 0 & 0 & s_3 & 0 \end{bmatrix}$$

Defining the following matrices $$T = \begin{bmatrix} t_1 \\ t_2 \\ t_3 \\ t_4 \end{bmatrix} = V_{4\times 4}^T \cdot \begin{bmatrix} R \\ G \\ B \\ P \end{bmatrix} \text{ and } S_{4\times 3}^{-1} = \begin{bmatrix} \frac{1}{s_1} & 0 & 0 \\ 0 & \frac{1}{s_2} & 0 \\ 0 & 0 & \frac{1}{s_3} \\ 0 & 0 & 0 \end{bmatrix}$$

then $$\begin{bmatrix} t_1 \\ t_2 \\ t_3 \\ t_4 \end{bmatrix} = S_{4\times 3}^{-1} \cdot U_{3\times 3}^T \begin{bmatrix} X \\ Y \\ Z \end{bmatrix}$$

As can be seen in this equation, the value of $t_4$ is not dependent on the value of XYZ and can thus be changed without affecting the resulting XYZ value. Therefore the set of RGBP values that will produce the same XYZ value can be defined as:

$$\begin{bmatrix} R \\ G \\ B \\ P \end{bmatrix} = V_{4\times 4} \begin{bmatrix} t_1 \\ t_2 \\ t_3 \\ t_4 \end{bmatrix} \text{ for all values of } t_4$$

FIGS. 5 and 6 demonstrate two spectral power distributions with RGBP values of [0.3, 0.5, 0.8, 0] and [0.2616, 0.5535, 0.2846, 1.0] respectively that both result in the same XYZ value of [0.4285, 0.4467, 0.8348]. To calculate the RGB value measured by the video camera, the product of the spectral power distribution and the video camera's spectral sensitivity functions shown in FIG. 3 is integrated. For the given pair of RGBP values, the resulting camera RGB values are [0.1848, 0.4511, 0.3516] and [0.1764, 0.5965, 0.3769] respectively. These are clearly two different colors as viewed by the video camera sensors. With the above results, the control signal 100 can vary the RGBP value that the color converter 20 outputs for a given RGB input over the set of RGBP values that produce the same XYZ response and thus the same perceived color on the display.

In one embodiment the RGBP value is varied in time to produce a temporal color modulation in the recorded image. This may be a slow variation over the set of RGBP metamers resulting in a slowing varying color distortion or quick transition between two metamers with significantly different spectral power distributions resulting in a flashing or flickering in the recorded image. In another embodiment the RGBP value is varied spatially to produce a visible impairment of an arbitrary shape in the recorded image. The shape may be selected to form text on the recorded image indicating that the recorded image was copied illegally or possibly the time and location of the presentation.

There are also numerous types of display systems that can be used to create the protected image. It is only necessary, in order to carry out the specific techniques being described, that the displayed image include four or more primary components over a space and time that is relevant for the presentation. In one embodiment, two different sets of three primary components can be created from individual light sources such as lasers and the set of primaries selected can be varied temporally. In another embodiment, photographic film can be modified to contain four or more primary components, the selection of which can be varied during the film processing. This allows application of the current invention with traditional film projection equipment.

Although the various aspects of the present invention have been described with respect to exemplary embodiments thereof, it will be understood that the present invention is entitled to protection within the full scope of the appended claims.

It is claimed:

1. A method of deterring the copying of visual images displayed on a movie screen, comprising:
    displaying the images on the screen using a system where the displayed spectrum forming individual images is a combination of more than three primary color components,
    varying the relative amplitudes of the more than three primary color components to represent the color spectrum of the visual images being displayed in a manner that is metameric to the human eye and therefore does not vary the perceived color representation of the images displayed on the screen, and
    recording the images displayed on the screen with a recording device having a spectral sensitivity function that is different from that of the human eye and not a linear combination thereof, thereby producing a visible color distortion in the recorded images,
    wherein varying the amplitudes of the more than three primary color components alters the spectral content of the visual images in a manner that is metameric and thus imperceptible to the human eye but not metameric to the video camera having a spectral sensitivity different from the spectral sensitivity of the human eye, and wherein color distortion is perceptible to the human eye in reproductions of the recorded images.

2. The method of claim 1, wherein varying the relative amplitudes of the color components of the visual images includes spatially varying the relative amplitudes across the visual images.

3. The method of claim 1, wherein varying the relative amplitudes of the color components of the visual images includes temporally varying the relative amplitudes between time sequential multiple frames of the visual images.

4. The method of claim 1, wherein varying the relative amplitudes of the color components of the visual images includes both spatially varying the relative amplitudes across the visual image and temporally varying the relative amplitudes between time sequential multiple frames of the visual images.

* * * * *